(12) United States Patent
Palac et al.

(10) Patent No.: US 10,690,289 B2
(45) Date of Patent: Jun. 23, 2020

(54) MODULAR GAS CONTROL ATTACHMENT ASSEMBLY FOR CYLINDERS

(71) Applicant: LINCOLN GLOBAL, INC., Santa Fe Springs, CA (US)

(72) Inventors: Adam Palac, Swidnica (PL); Randy Edenfield, Lula, GA (US); Marco Giannelli, Granarolo (IT); David Gailey, Lula, GA (US)

(73) Assignee: LINCOLN GLOBAL, INC., San, CA (US)

( * ) Notice: Subject to any disclaimer, the term of this patent is extended or adjusted under 35 U.S.C. 154(b) by 348 days.

(21) Appl. No.: 15/802,098

(22) Filed: Nov. 2, 2017

(65) Prior Publication Data

US 2019/0128479 A1    May 2, 2019

(51) Int. Cl.
  *F17C 13/04*     (2006.01)
  *F16K 27/00*     (2006.01)
  *F16K 37/00*     (2006.01)
  *F17C 3/08*      (2006.01)

(52) U.S. Cl.
  CPC ............ *F17C 13/04* (2013.01); *F16K 27/003* (2013.01); *F16K 37/0008* (2013.01); *F17C 3/085* (2013.01); *F17C 2205/0146* (2013.01); *F17C 2205/0323* (2013.01); *F17C 2205/0385* (2013.01); *F17C 2221/011* (2013.01); *F17C 2221/013* (2013.01); *F17C 2221/014* (2013.01); *F17C 2221/017* (2013.01); *F17C 2223/0161* (2013.01); *F17C 2270/0509* (2013.01); *Y10T 137/87885* (2015.04)

(58) Field of Classification Search
  CPC .............. F17C 13/04; F17C 2205/0385; F17C 2205/0146; Y10T 137/87885; F16K 27/003; F16K 37/0008
  See application file for complete search history.

(56) References Cited

U.S. PATENT DOCUMENTS 3,495,625 A * 2/1970 Norman ................... F16K 39/04
                                                137/637.4
3,804,056 A * 4/1974 Lee ...................... F16K 37/0008
                                                116/277
3,908,871 A * 9/1975 Gottwald ............. B67D 1/0829
                                                222/400.7

(Continued)

FOREIGN PATENT DOCUMENTS

JP      2005-095491    * 11/2003

*Primary Examiner* — Atif H Chaudry

(57) ABSTRACT

Provided is a manifold attachment assembly for attachment to a cryogenic cylinder. The assembly includes a knuckle configured to be attached to the cryogenic cylinder and a manifold configured to be attached to the knuckle. The manifold has an upper surface, a lower surface configured to abut an upper surface of the knuckle, a plurality of gas passages extending through the manifold for aligning with a corresponding one of a plurality of gas passages in the knuckle, and a plurality of valve seats in the upper surface each in communication with one of the plurality of gas passages in the manifold. The assembly also includes a plurality of valves respectively secured to the manifold in one of the plurality of valve seats. The attachment assembly provides a modular assembly that reduces refurbishment and requalification time, reduces assembly labor, and simplifies servicing.

15 Claims, 17 Drawing Sheets

(56) References Cited

U.S. PATENT DOCUMENTS

| | | | | |
|---|---|---|---|---|
| 5,829,472 A | * | 11/1998 | Greenwood | F16K 7/16 137/312 |
| 2001/0052360 A1 | * | 12/2001 | Bryselbout | F17C 13/04 137/264 |
| 2002/0148530 A1 | * | 10/2002 | Caparros | B65D 90/10 141/86 |
| 2010/0006787 A1 | * | 1/2010 | Nakata | F16K 27/003 251/12 |

* cited by examiner

MODULAR GAS CONTROL ATTACHMENT ASSEMBLY FOR CYLINDERS

TECHNICAL FIELD

In general, the present invention relates to a modular gas control attachment assembly for a cylinder, such as a cryogenic cylinder.

BACKGROUND OF THE INVENTION

To store cryogens, such as liquid nitrogen or liquid helium, a dewar or vacuum flask is provided. The dewar can be in the form of a storage cylinder having two or more layers with a vacuum maintained between the layers to provide thermal insulation between the interior and exterior of the container.

SUMMARY OF THE INVENTION

In accordance with an embodiment of the present invention, a manifold attachment assembly for a cylinder is provided. The assembly includes a knuckle having an upper surface, a lower surface configured to be attached to the cylinder, a plurality of first gas passages extending through the knuckle from the upper surface to the lower surface, and at least one second gas passage extending through the knuckle from a side of the knuckle to the lower surface, a manifold block configured to be attached to the knuckle, the manifold block having an upper surface, a lower surface configured to abut the upper surface of the knuckle, a plurality of valve seats in the upper surface, a plurality of first gas passages each in communication with one of the valve seats and opening to the lower surface of the manifold block to be in fluid communication with one of the first gas passages in the knuckle, and a plurality of second gas passages each in communication with one of the valve seats and opening to a side of the manifold block, and a plurality of valves each secured to the manifold block in one of the valve seats, the valves being movable between an open position allowing flow between the first gas passages of the manifold block and the respective second gas passages of the manifold block, and a closed position blocking flow between the first gas passages of the manifold block and the respective second gas passages of the manifold block.

In accordance with an embodiment of the present invention, another manifold attachment assembly for a cryogenic cylinder is provided. The assembly includes a knuckle configured to be attached to the cryogenic cylinder, the knuckle including a plurality of fastener openings, a plurality of gas passages extending therethrough, and a seal groove in an upper surface of the knuckle surrounding each of the plurality of gas passages, a seal disposed in each of the seal grooves, a manifold configured to be attached to the knuckle, the manifold having an upper surface, a lower surface configured to abut the upper surface of the knuckle, a plurality of fastener openings configured to be aligned with a corresponding one of the plurality of fastener openings in the knuckle, a plurality of gas passages extending therethrough for aligning with a corresponding one of the plurality of gas passages in the knuckle and configured to be sealed to the knuckle by a respective one of the seals, and a plurality of valve seats in the upper surface each in communication with one of the plurality of gas passages, and a plurality of valves respectively secured to the manifold in one of the plurality of valve seats.

In accordance with an embodiment of the present invention, still another manifold attachment assembly for a cylinder is provided. The assembly includes a knuckle having an upper surface, a lower surface configured to be attached to the cylinder, a plurality of first gas passages extending through the knuckle from the upper surface to the lower surface, at least one second gas passage extending through the knuckle from a side of the knuckle to the lower surface, at least one third gas passage extending through the knuckle from the upper surface to the lower surface, at least one fourth gas passage extending through the knuckle from the upper surface to the lower surface, and a plurality of blind holes extending from the upper surface toward the lower surface, a manifold block removably attached to the knuckle, the manifold block having an upper surface, a lower surface abutting the upper surface of the knuckle, a plurality of through holes each aligned with a respective one of the plurality of blind holes, a plurality of valve seats in the upper surface, a plurality of first gas passages each in communication with one of the valve seats and opening to the lower surface of the manifold block for fluid communication with one of the first gas passages in the knuckle, a plurality of second gas passages each in communication with one of the valve seats and opening to a side of the manifold block, at least one third passage extending through the manifold block from the upper surface to the lower surface of the manifold block for fluid communication with the at least one third passage in the knuckle, and at least one fourth passage that opens to the side of the manifold block and to the lower surface of the manifold block for fluid communication with the at least one fourth passage in the knuckle, a fastener extending through each through hole and corresponding blind hole and secured to the knuckle to removably attach the manifold block to the knuckle, and a plurality of valves each secured to the manifold block in one of the valve seats, the valves being movable between an open position allowing flow between the first gas passages and the respective second gas passages, and a closed position blocking flow between the first gas passages and the respective second gas passages.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
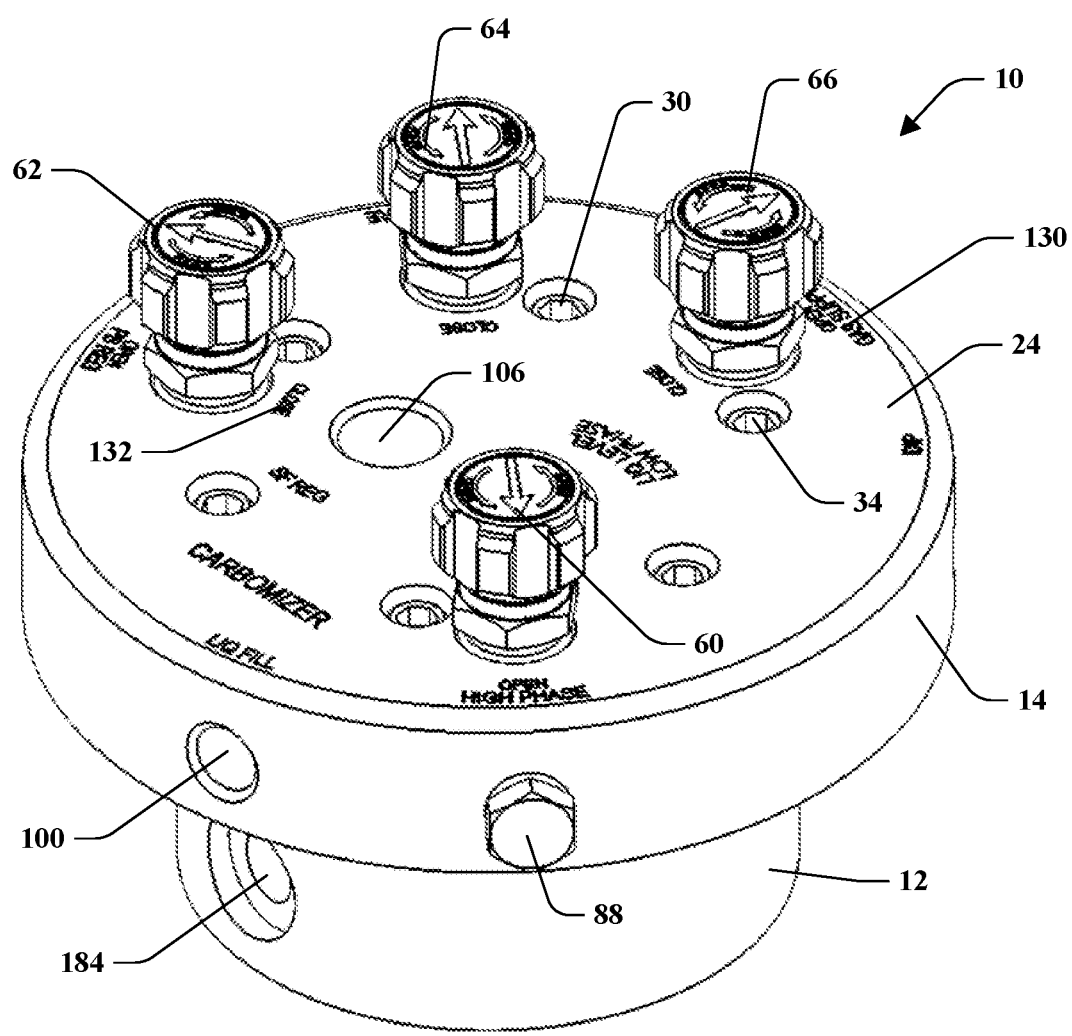
FIG. 1 is a perspective view of an exemplary attachment assembly.
Figure 2:
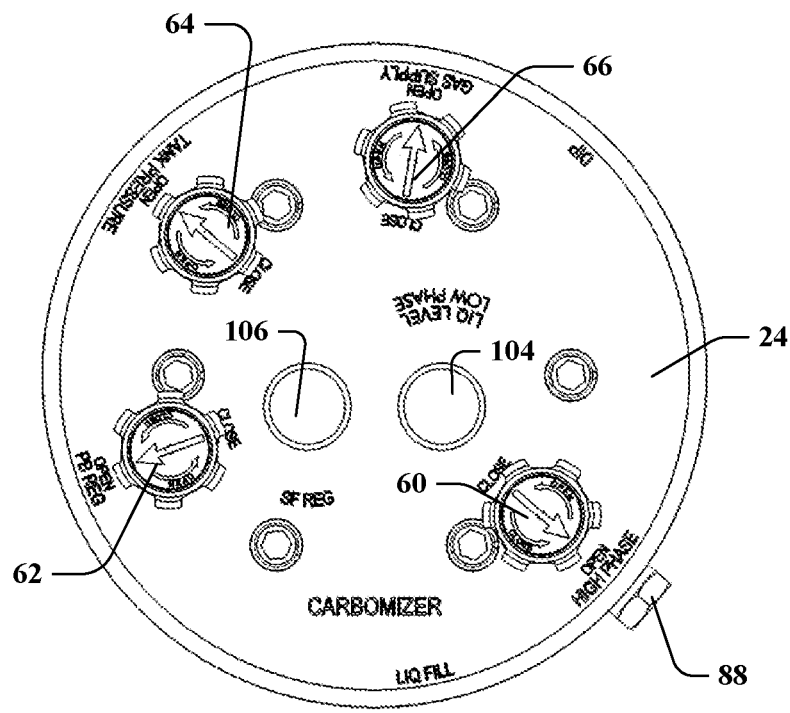
FIG. 2 is a top view of the attachment assembly.
Figure 3:
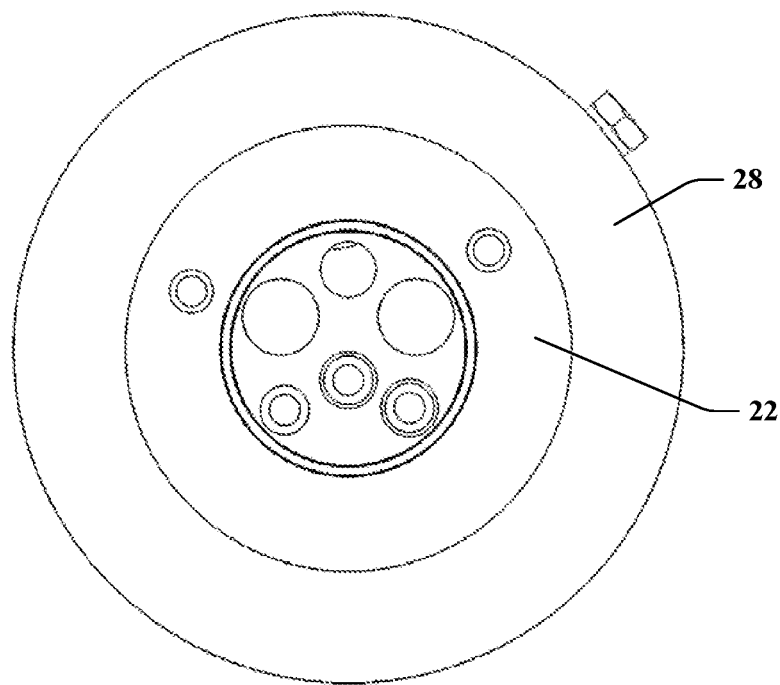
FIG. 3 is a bottom view of the attachment assembly.
Figure 4:
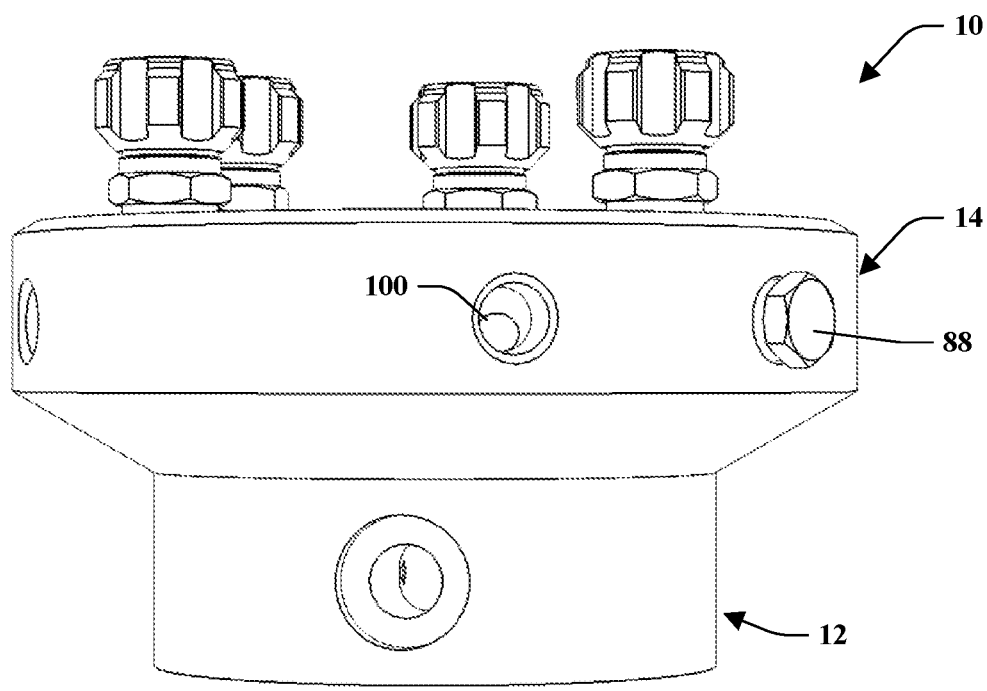
FIG. 4 is a front view of the attachment assembly.
Figure 5:
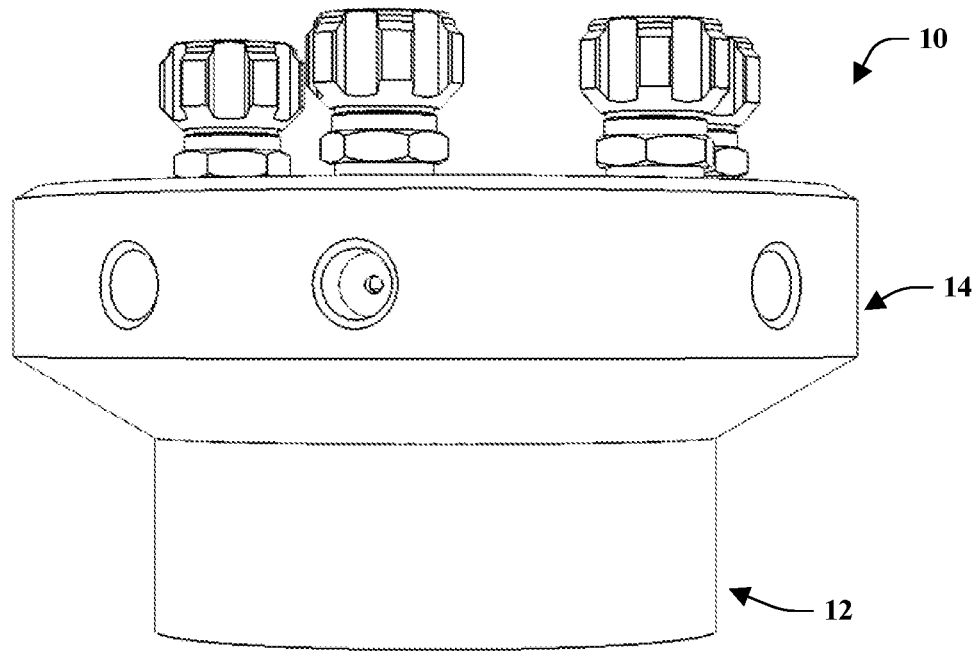
FIG. 5 is a back view of the attachment assembly.
Figure 6:
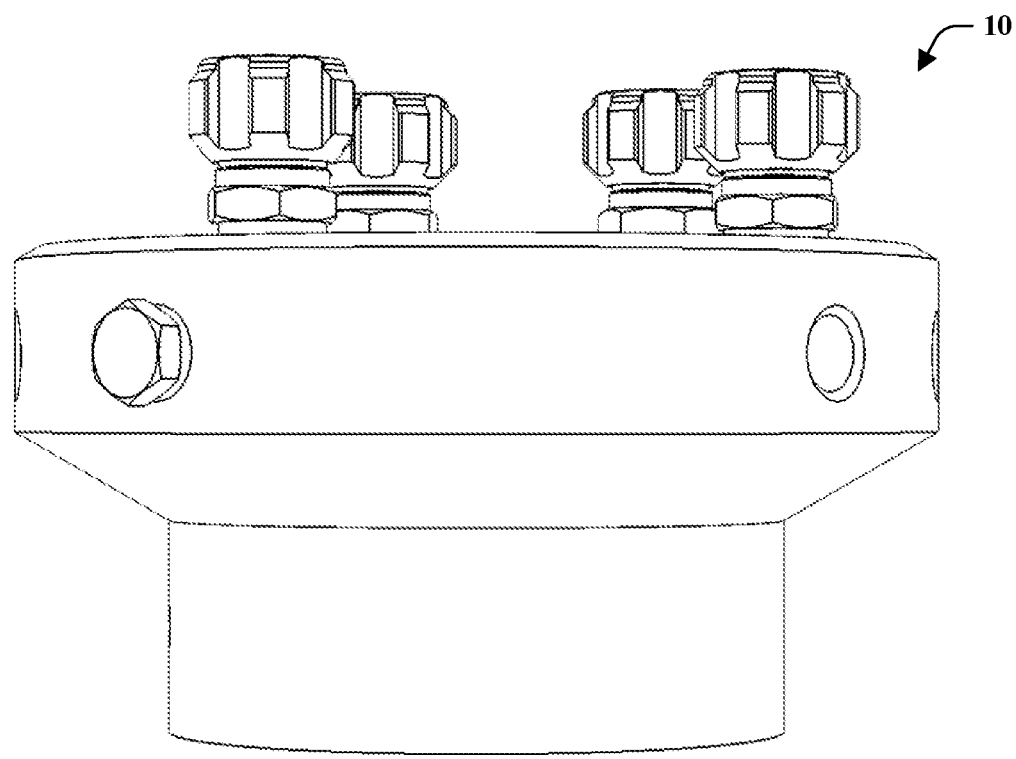
FIG. 6 is a left side view of the attachment assembly.
Figure 7:
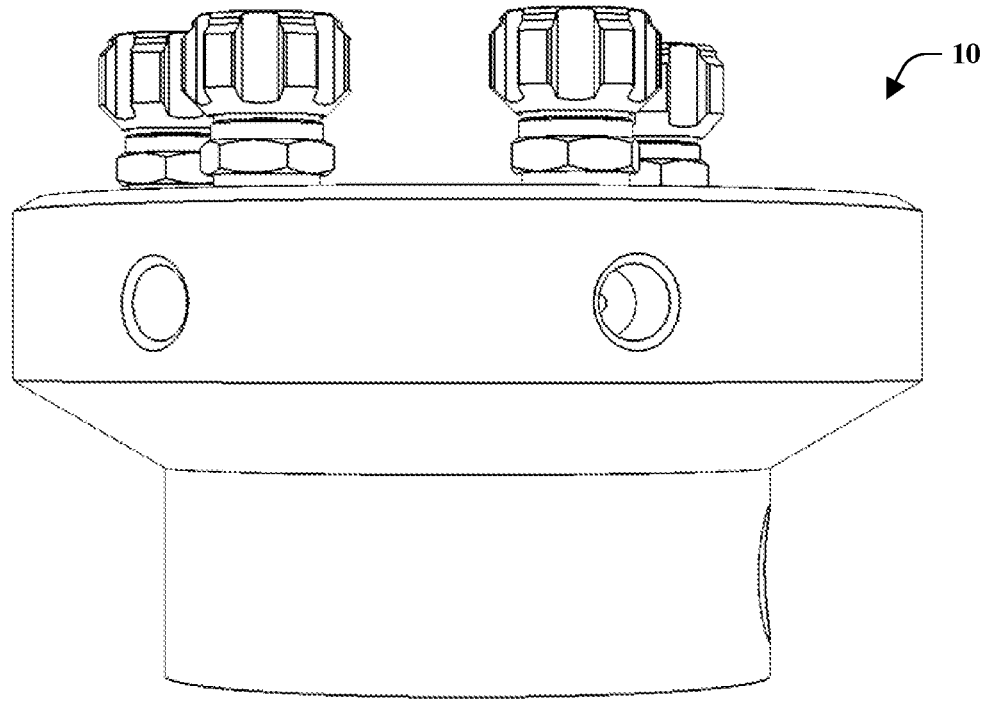
FIG. 7 is a right side view of the attachment assembly.
Figure 8:
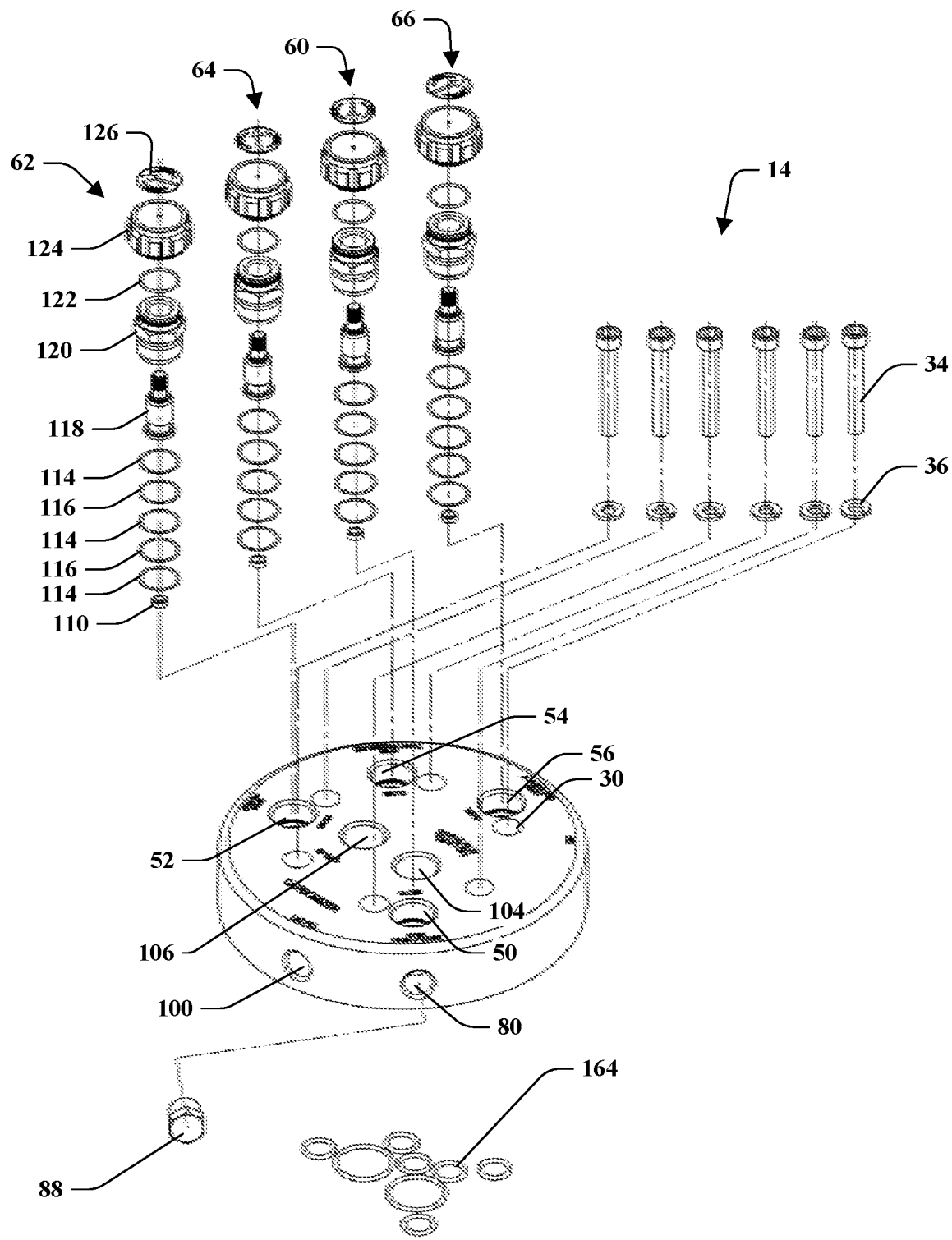
FIG. 8 is an exploded view of a manifold of the attachment assembly.
Figure 9:
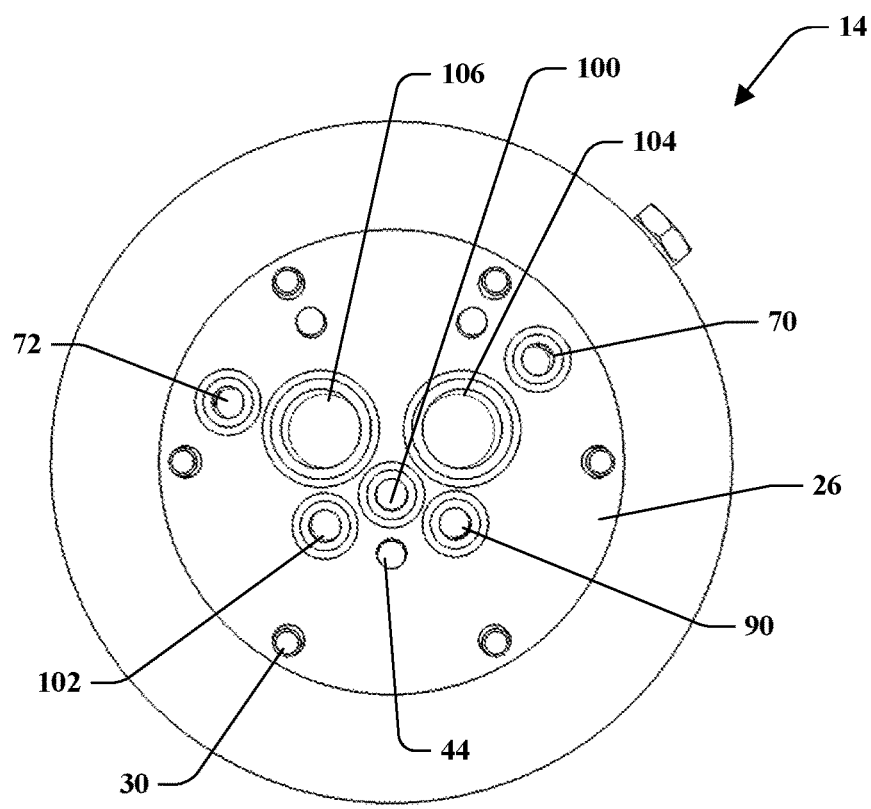
FIG. 9 is a bottom view of the manifold.
Figure 10:
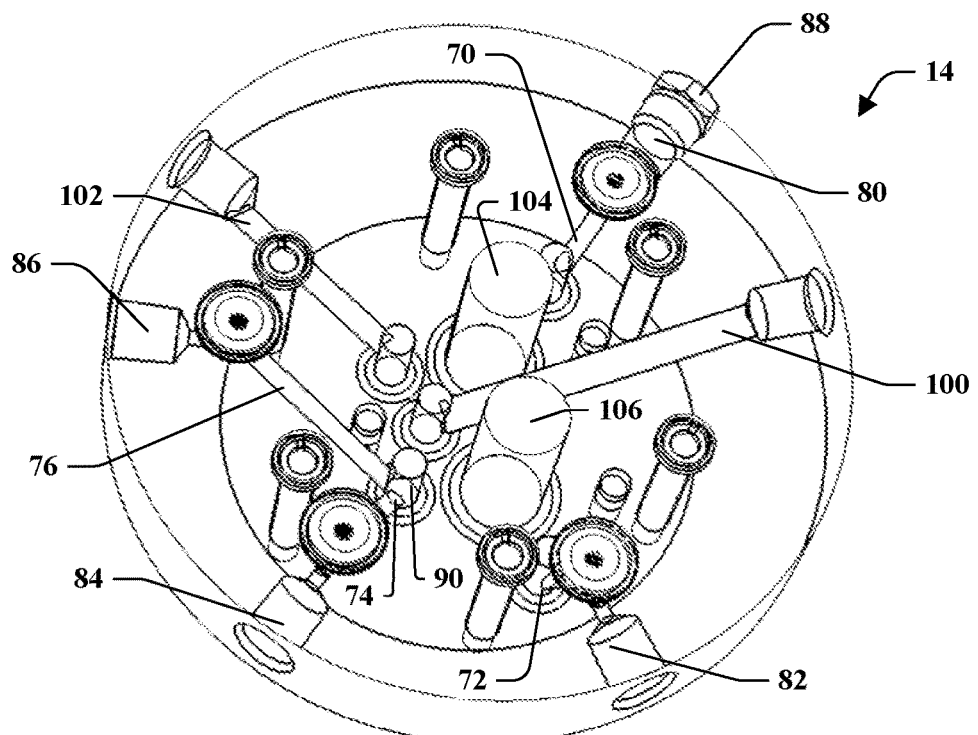
FIG. 10 is a transparent cross-sectional view the manifold showing passages of the manifold.
Figure 11:
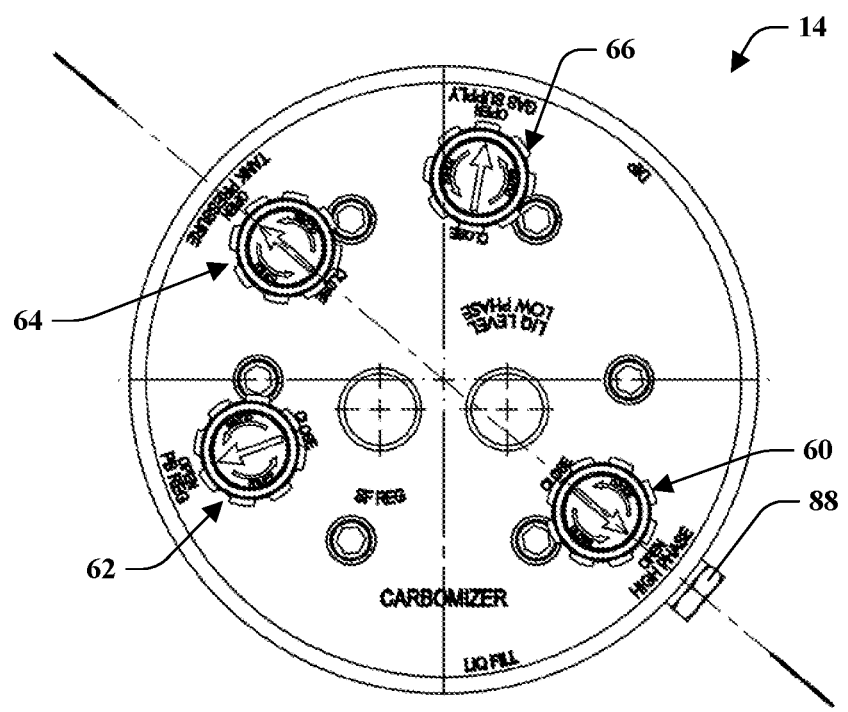
FIG. 11 is a top view of the manifold.
Figure 12:
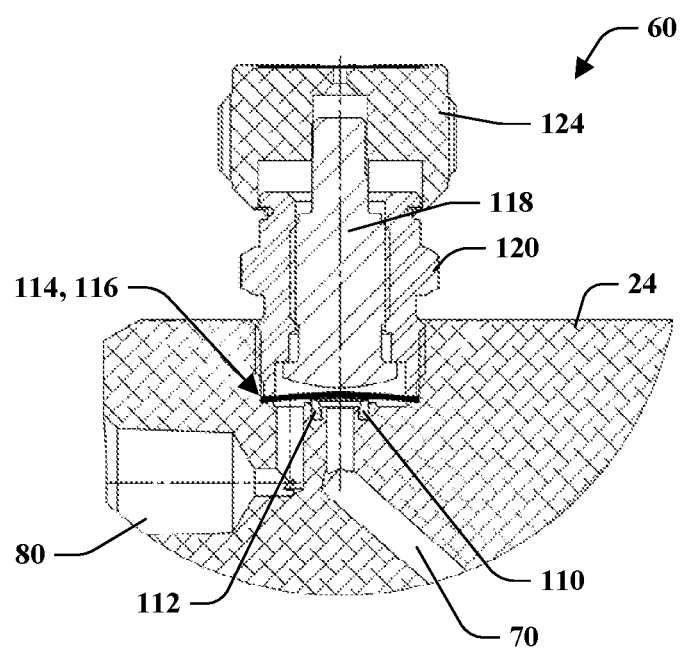
FIG. 12 is a partial cross-sectional view of the manifold.
Figure 13:
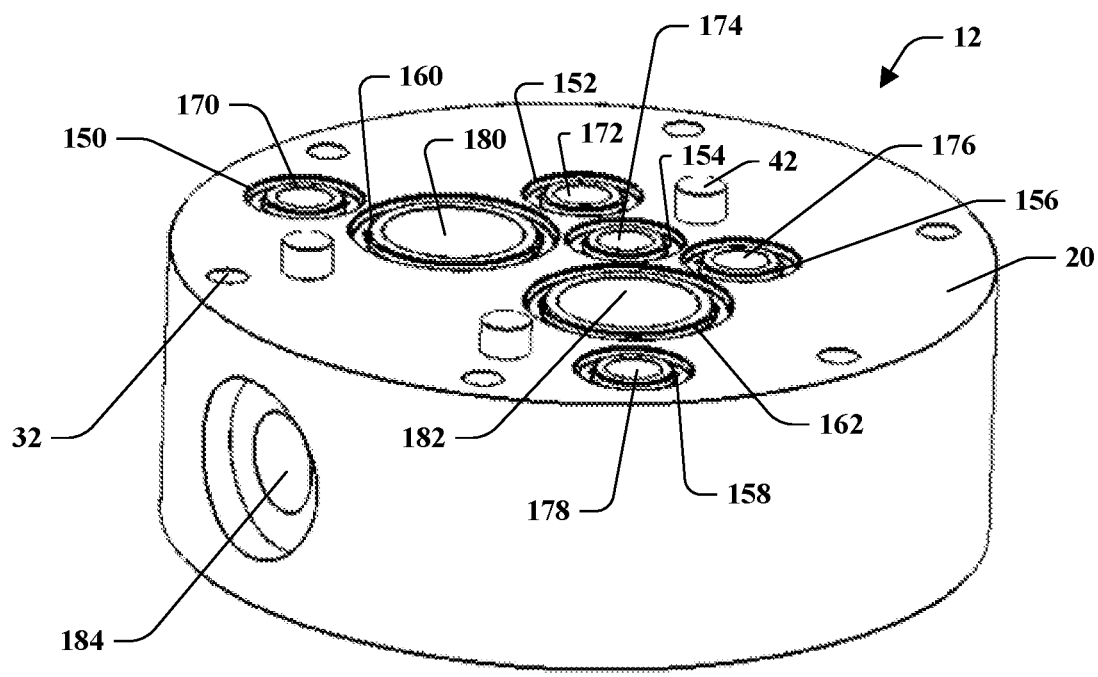
FIG. 13 is a perspective view of a knuckle of the attachment assembly.
Figure 14:
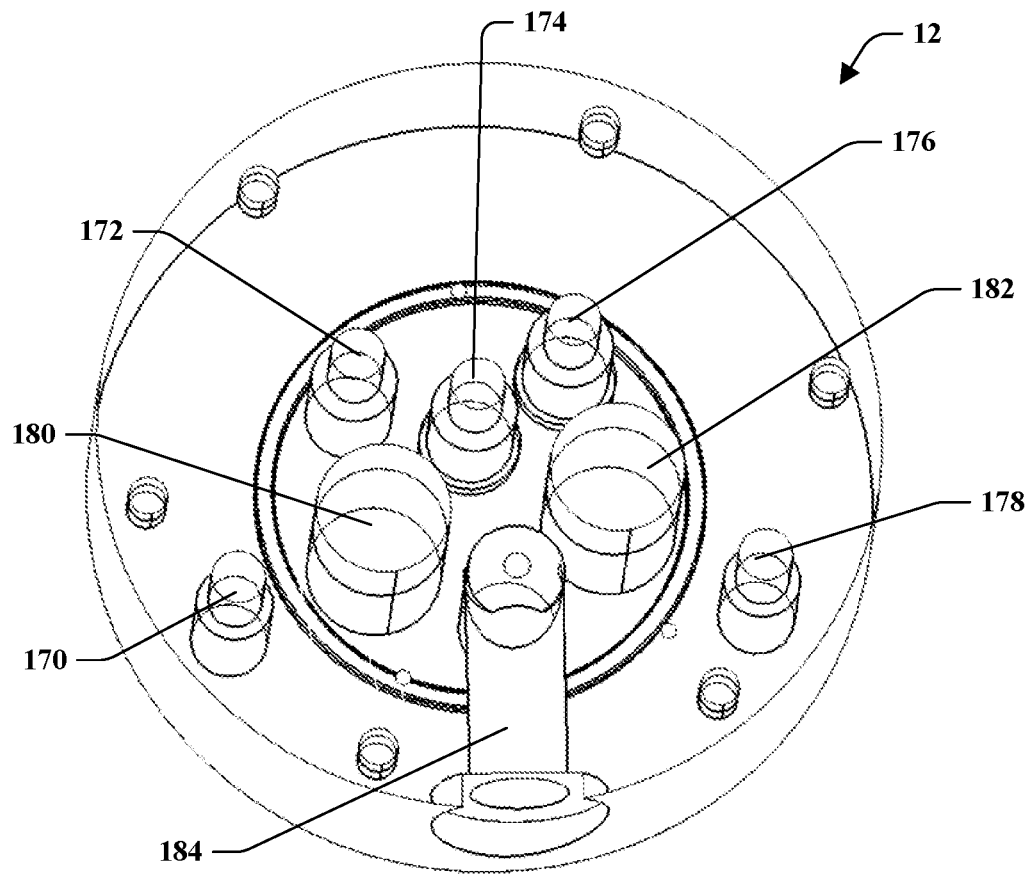
FIG. 14 is a transparent cross-sectional view of the knuckle showing passages of the knuckle.

Embodiments of the invention relate manifold attachment assemblies for attachment to a cylinder, such as a cryogenic cylinder. The manifold attachment assemblies include a knuckle, a manifold block attachable to the knuckle, and a plurality of valves secured to the manifold block. The knuckle has an upper surface, a lower surface configured to be attached to the cylinder, a plurality of first gas passages extending through the knuckle from the upper surface to the lower surface, and at least one second gas passage extending through the knuckle from a side of the knuckle to the lower surface. The manifold block has an upper surface, a lower surface configured to abut the upper surface of the knuckle, a plurality of valve seats in the upper surface, a plurality of first gas passages each in communication with one of the valve seats and opening to the lower surface of the manifold block to be in fluid communication with one of the first gas passages in the knuckle, and a plurality of second gas passages each in communication with one of the valve seats and opening to a side of the manifold block. The valves are each secured to the manifold block in one of the valve seats and are movable between an open position allowing flow between the first gas passages and the respective second gas passages, and a closed position blocking flow between the first gas passages and the respective second gas passages.

Referring now to the drawings and initially to FIGS. 1-9 and 13, an exemplary attachment assembly is illustrated at reference numeral 10. The attachment assembly includes a knuckle 12 configured to be attached to a dewar in any suitable manner such as welding, and a manifold block 14 configured to be removably attached to the knuckle 12. The dewar can be in the form of a storage cylinder, such as a cryogenic cylinder that stores any suitable liquid or gas, such as carbon dioxide, nitrogen, oxygen, etc. The knuckle 12 and manifold block 14 may be made of any suitable material, such as stainless steel, and provide various circuits to the cylinder, such as a safety circuit, a gas distribution circuit for controlling pressure and gas going downstream, a pressure building circuit for controlling head pressure inside a gas space in the dewar, and an optional second safety circuit for example.

Figure 15:
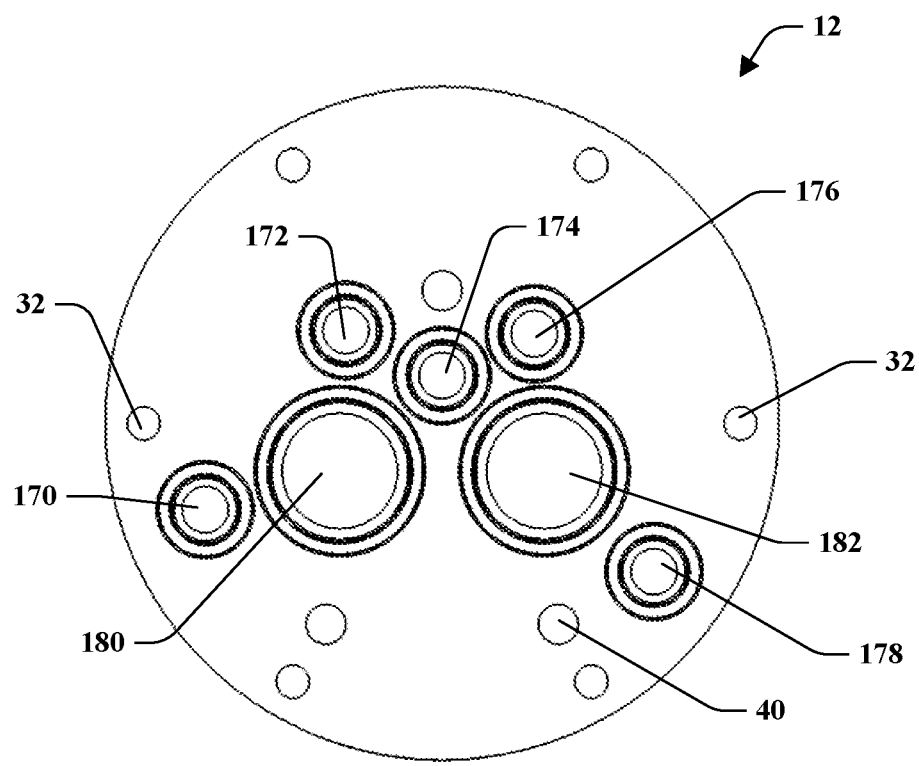
FIG. 15 is a top view of the knuckle.
Figure 16:
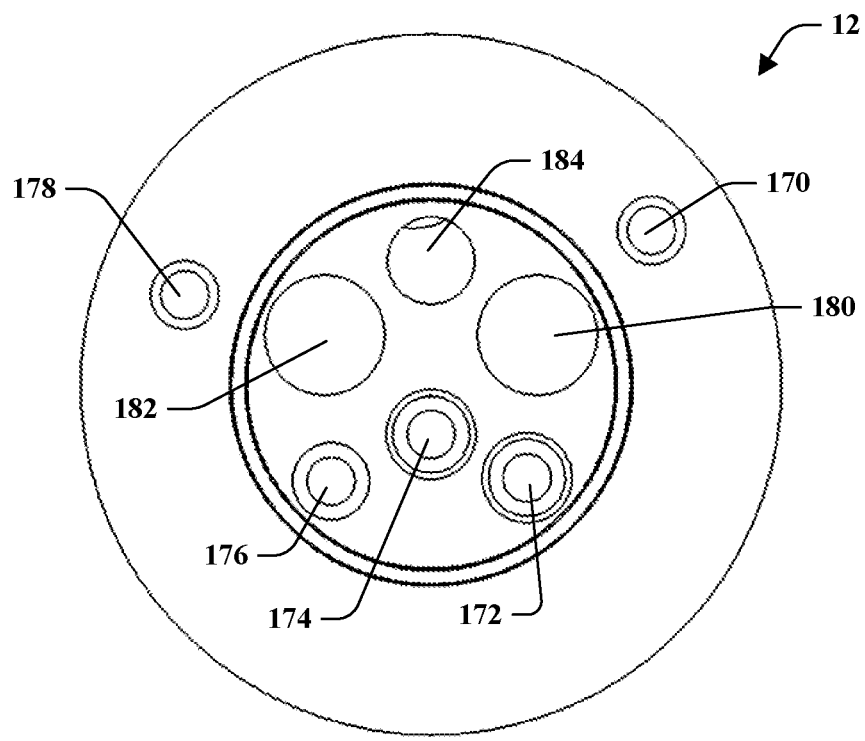
FIG. 16 is a bottom view of the knuckle.
Figure 17:
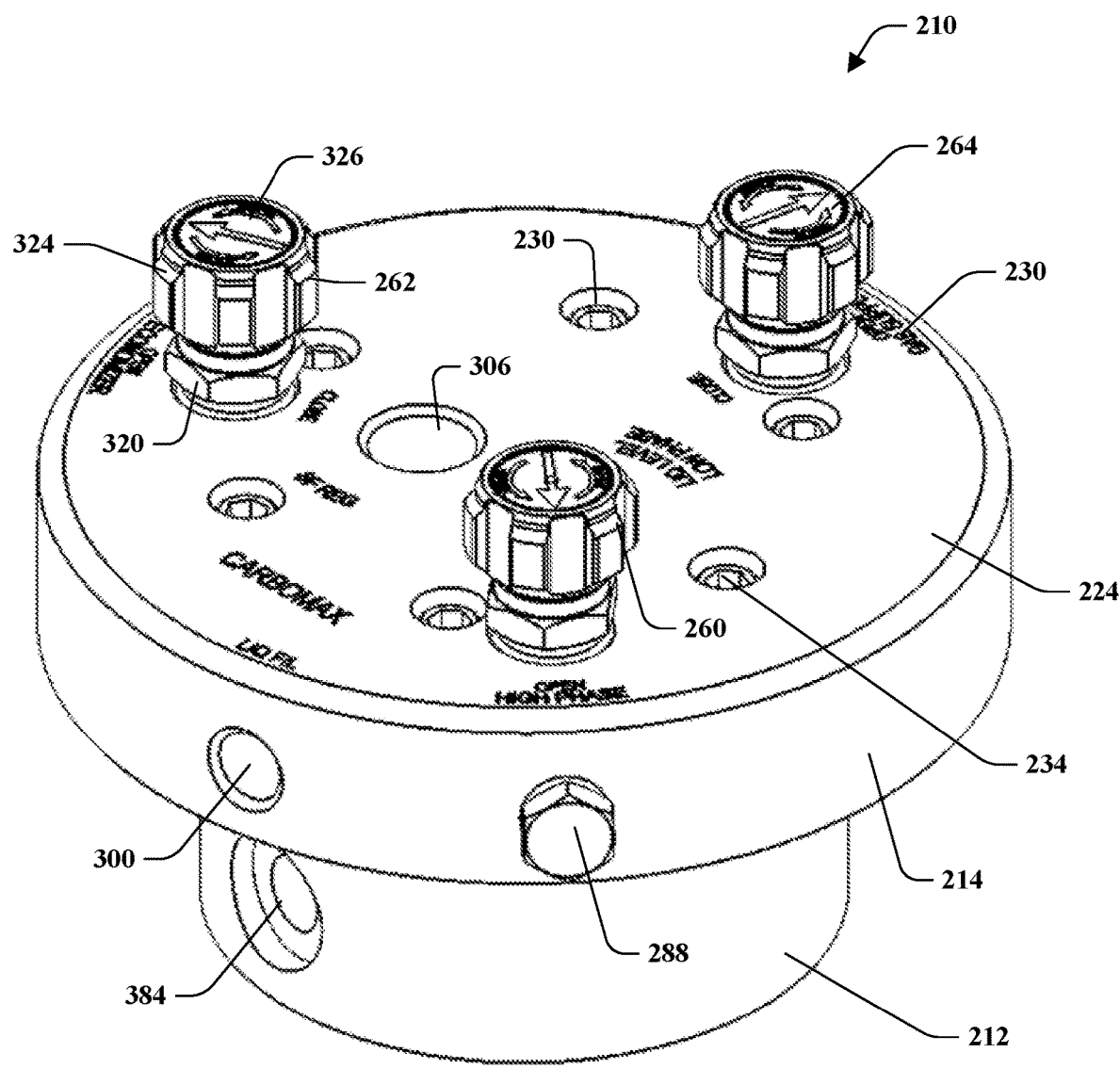
FIG. 17 is a perspective view of another exemplary attachment assembly.
Figure 18:
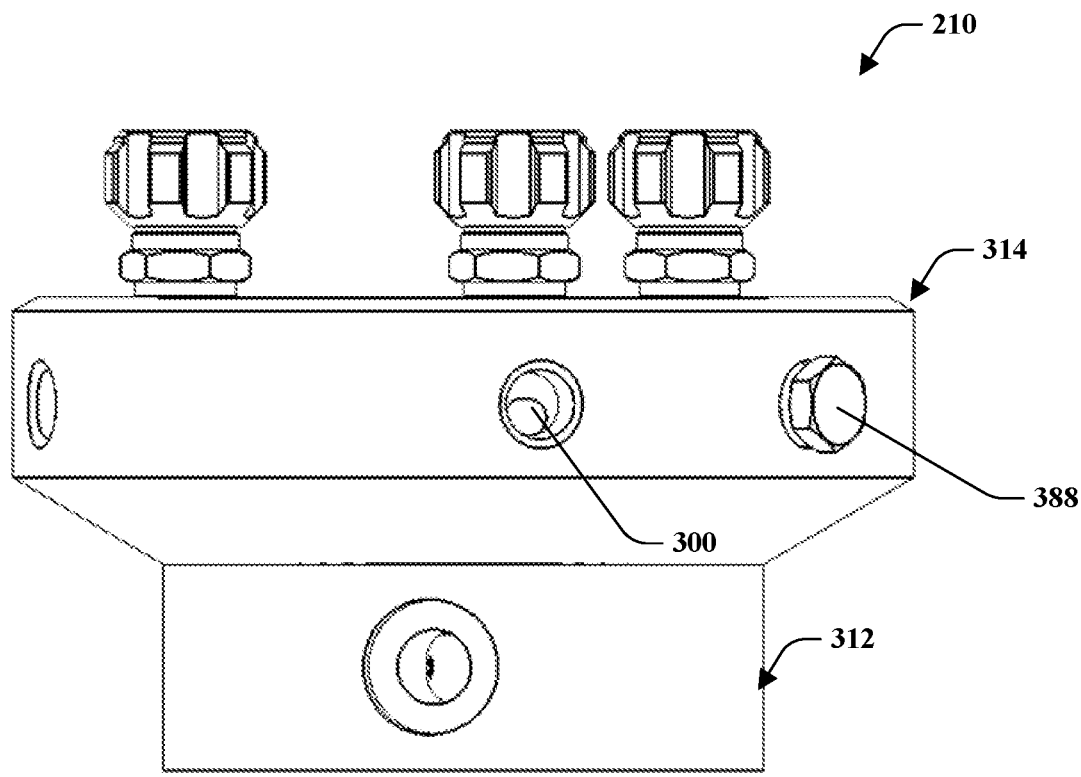
FIG. 18 is a front view of the attachment assembly.
Figure 19:
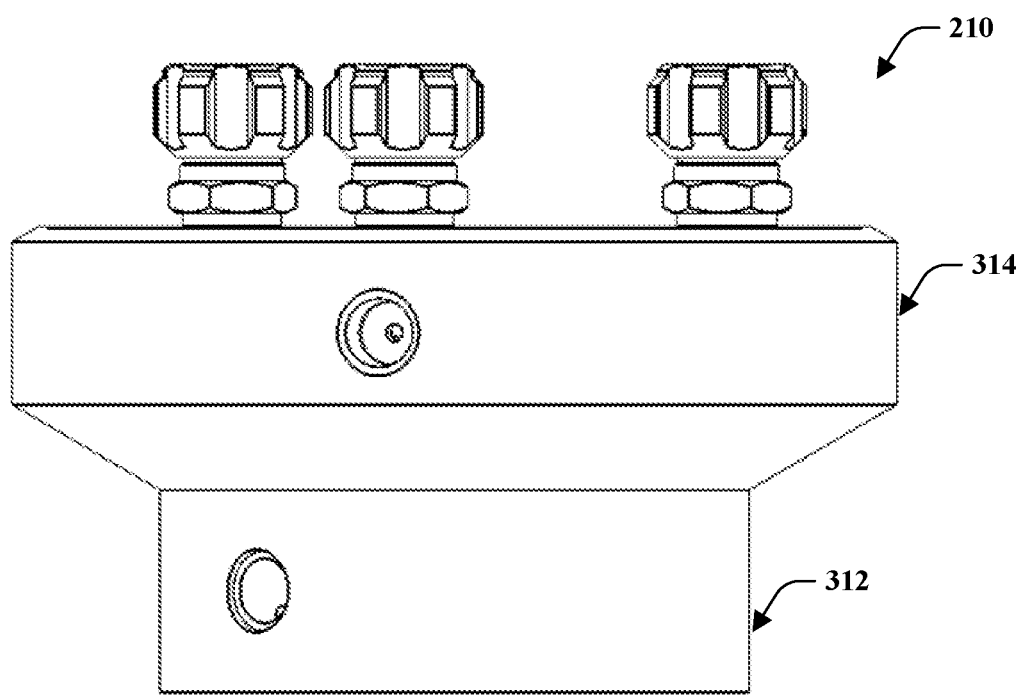
FIG. 19 is a back view of the attachment assembly.
Figure 20:
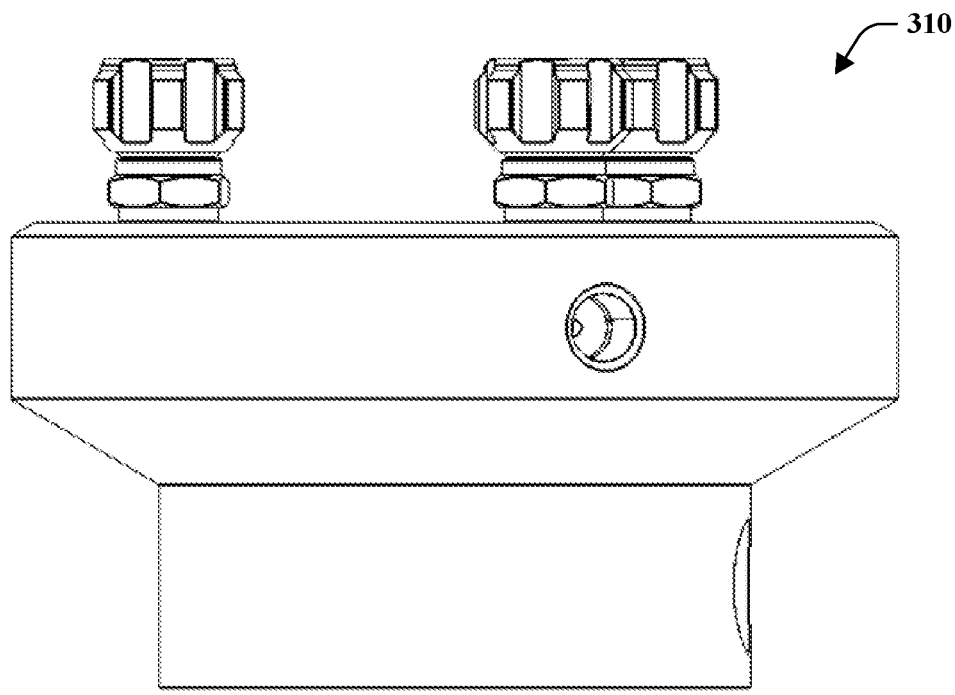
FIG. 20 is a left side view of the attachment assembly.
Figure 21:
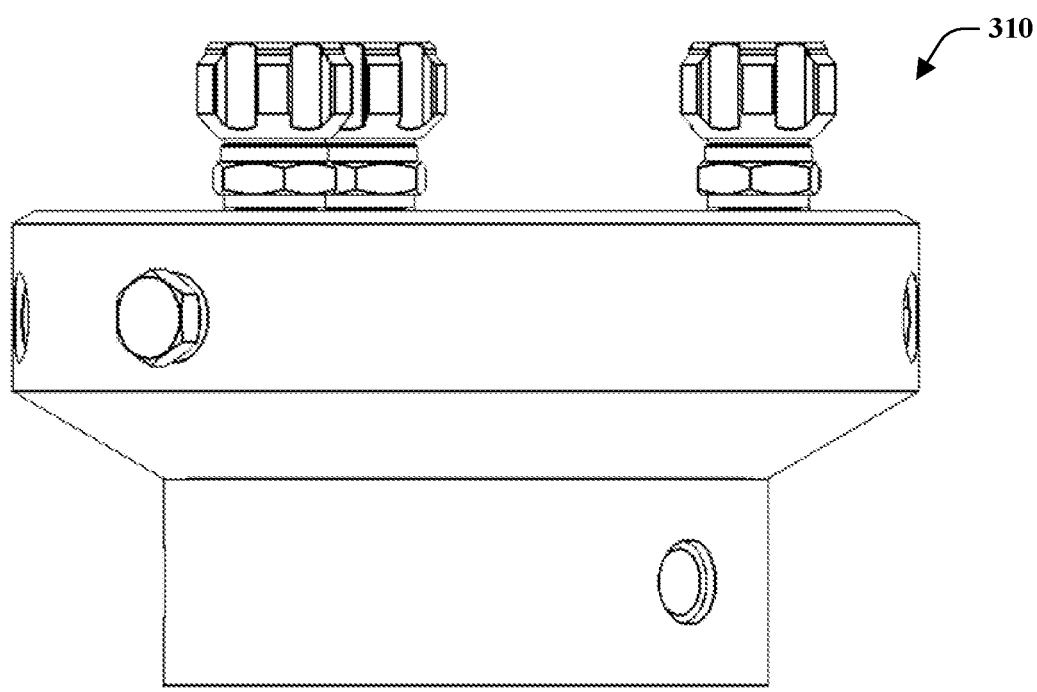
FIG. 21 is a right side view of the attachment assembly.
Figure 22:
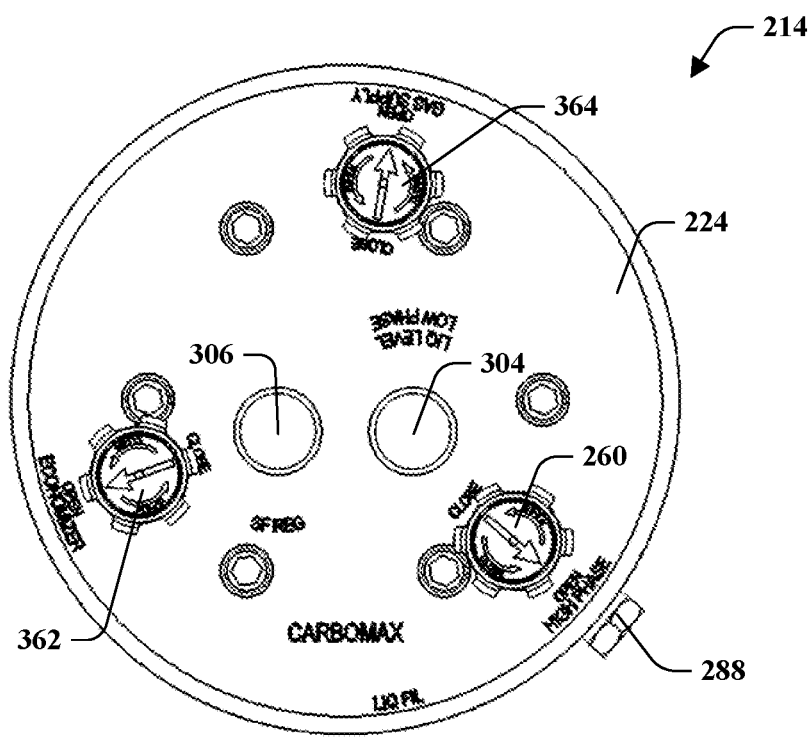
FIG. 22 is a top view of a manifold of the attachment assembly.
Figure 23:
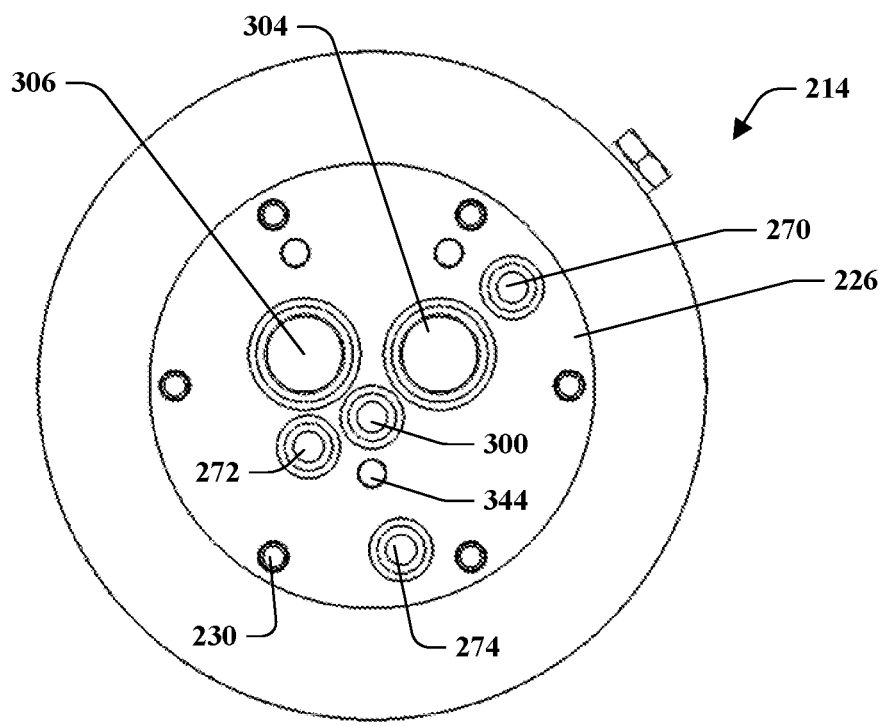
FIG. 23 is a bottom view of the manifold.
Figure 24:
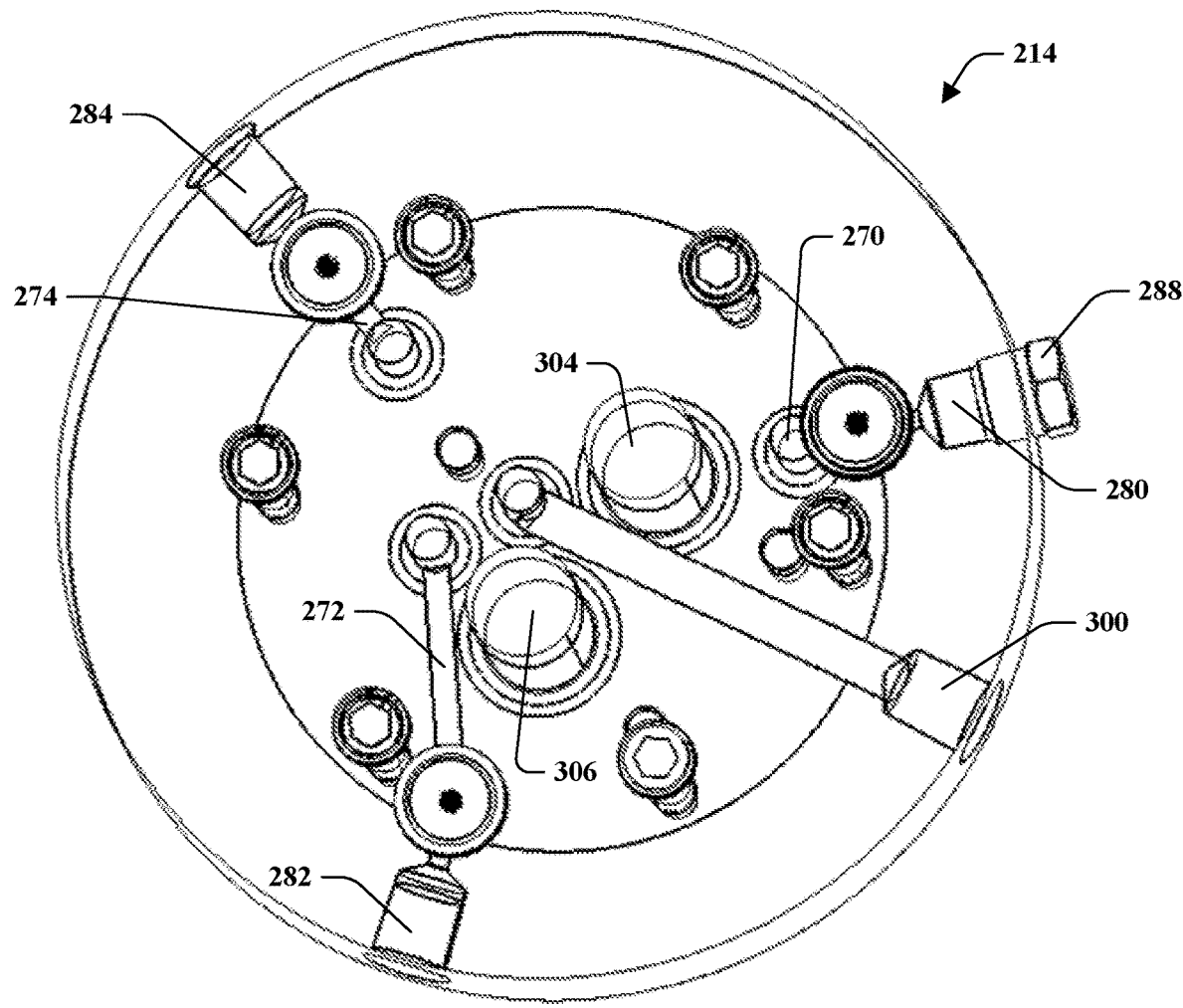
FIG. 24 is a transparent cross-sectional view the manifold showing passages of the manifold.
Figure 25:
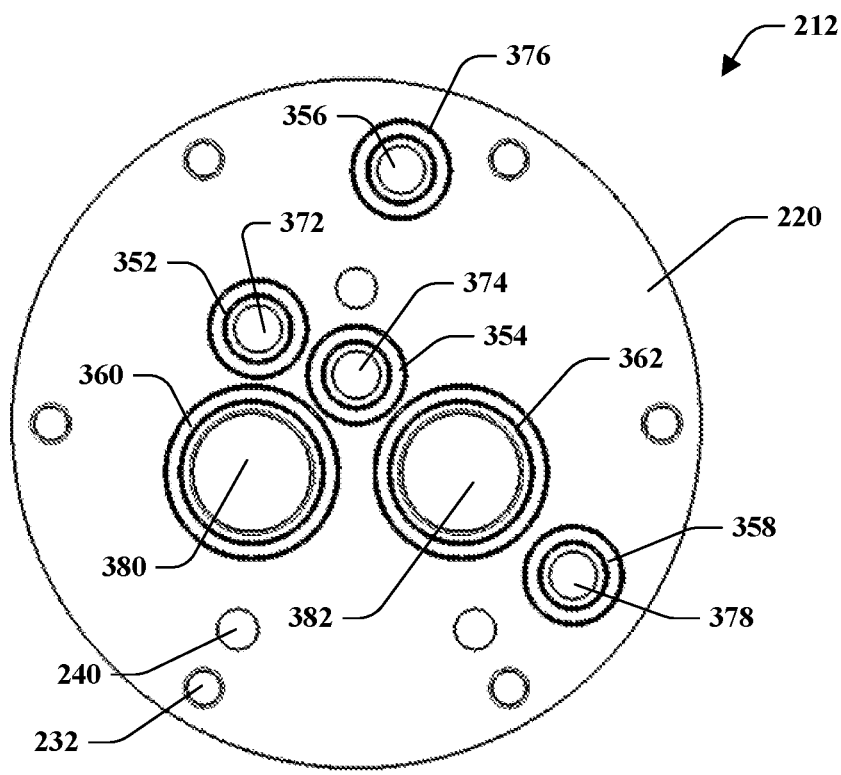
FIG. 25 is a top view of a knuckle of the attachment assembly.
Figure 26:
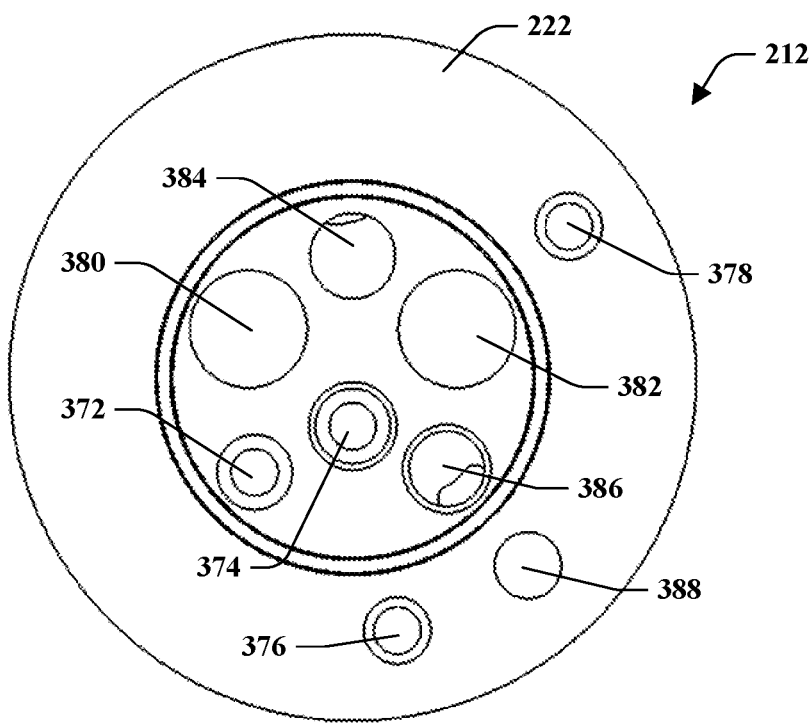
FIG. 26 is a bottom view of the knuckle.
Figure 27:
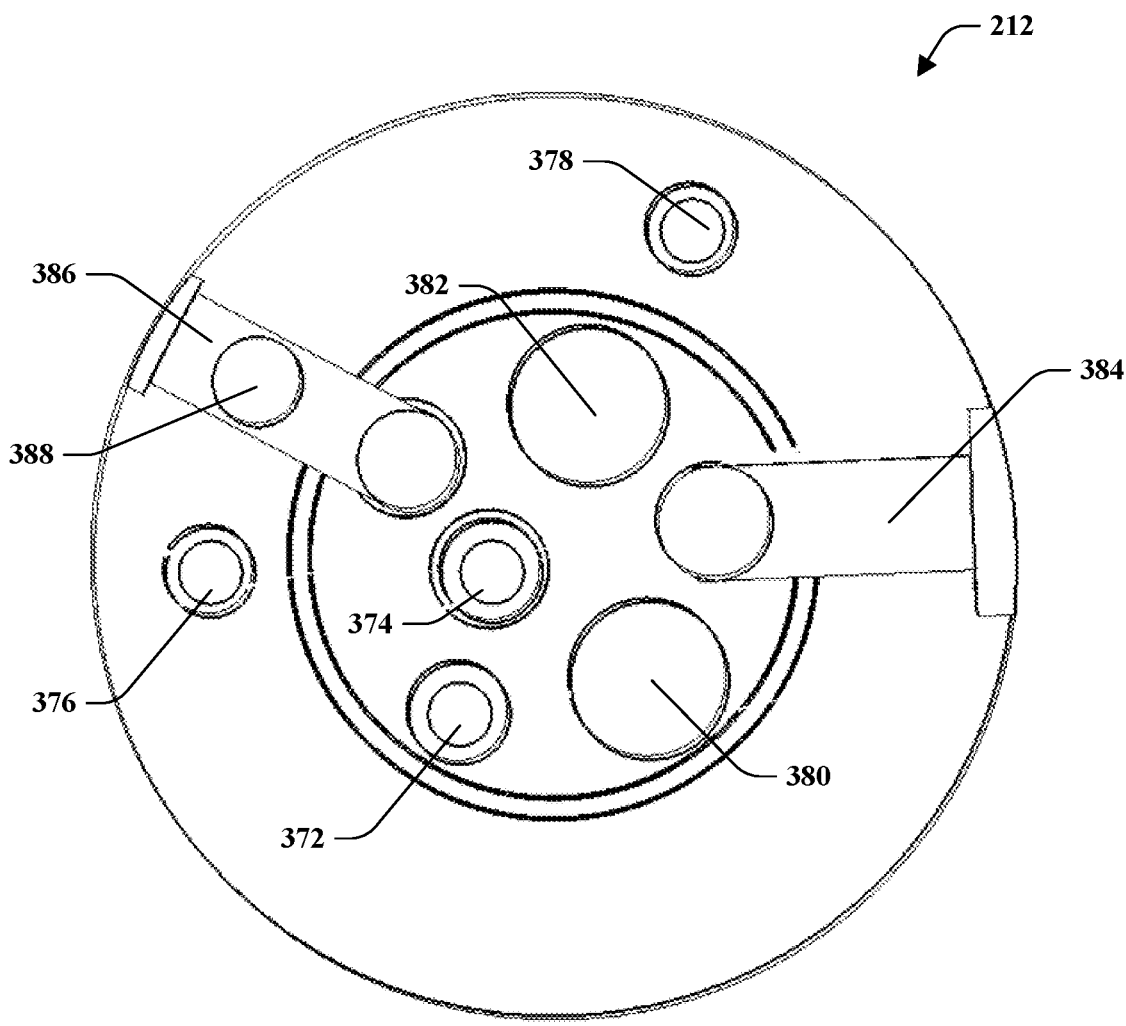
FIG. 27 is a transparent cross-sectional view of the knuckle showing passages of the knuckle.
Figure 28:
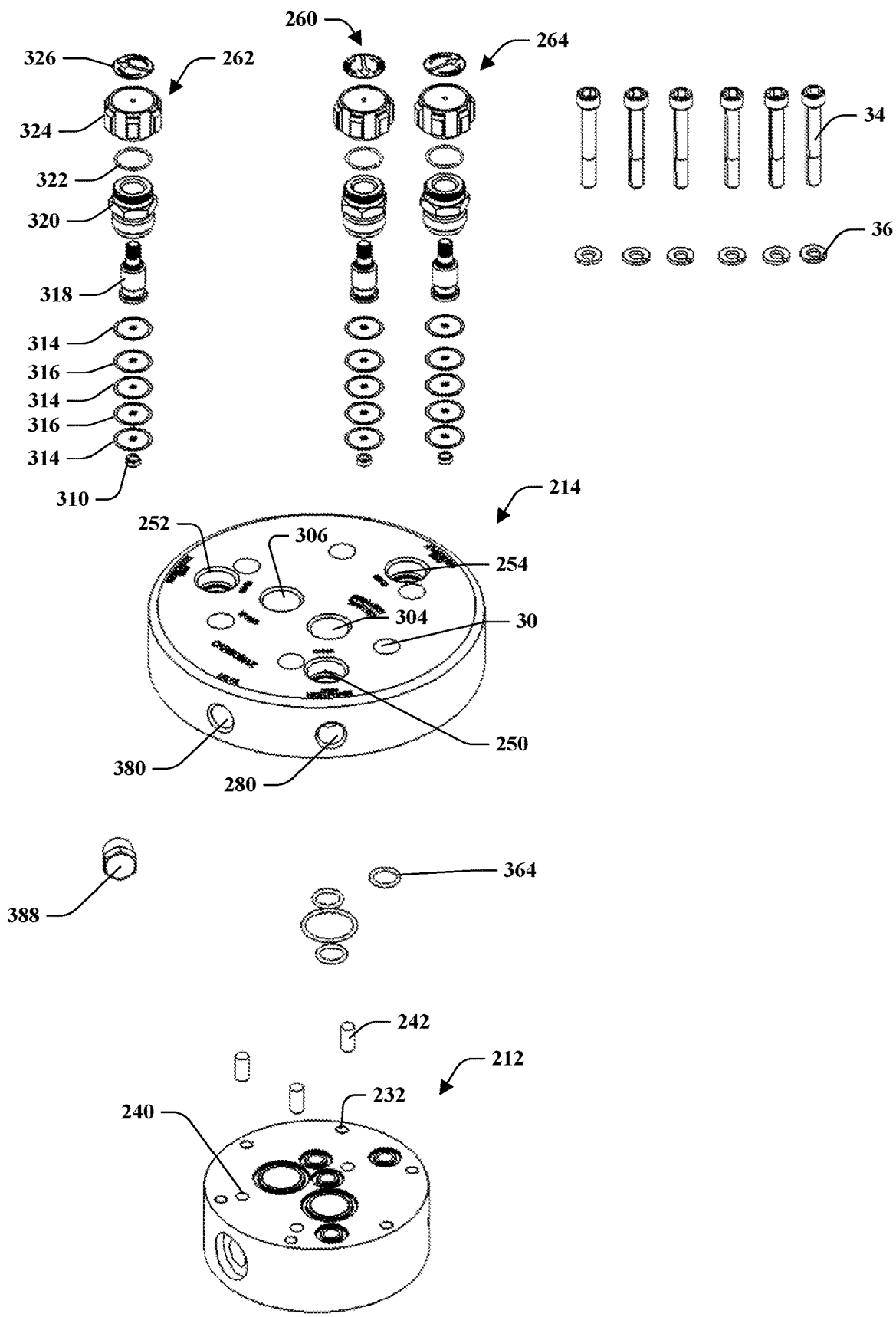
FIG. 28 is an exploded view of the attachment assembly.

As shown, the knuckle 12 includes an upper surface 20 and a lower surface 22 configured to be attached to the cylinder, and the manifold block 14 includes an upper surface 24 and a lower surface 26 that abuts the upper surface 20 of the knuckle 12. The manifold block 14 is shown having a greater diameter than the knuckle 12, and may include an angled surface 28 between the side of the manifold block 14 and the lower surface 26 such that the upper surface 24 and side have the greater diameter and the lower surface 26 has substantially the same diameter as the upper surface 20 of the knuckle 12. To attach the manifold block 14 to the knuckle, the manifold block 14 includes a plurality of through holes 30, and as illustrated six counter-bored through holes equally spaced around the upper surface 24, that align with a respective one of a plurality of blind holes 32 extending from the upper surface 20 of the knuckle toward the lower surface 22. Each through hole 30 and blind hole 32 receives a fastener 34, such as a stainless steel cap screw surrounded by a respective washer 36. To align the knuckle 12 and the manifold block 14, the knuckle 12 includes one or more blind holes 40 (FIG. 15), and as illustrated three blind holes extending from the upper surface 20 toward the lower surface 22 that receive a respective pin 42 pressed to a bottom of each blind hole 40, and the manifold block 14 includes a corresponding number of blind holes 44 extending from the lower surface 26 toward the upper surface 24 to receive the respective pins 42.

Referring additionally to FIGS. 8-12 and the manifold block 14 in detail, the manifold block includes a plurality of valve seats 50, 52, 54, and 56 in the upper surface 24. Each valve seat 50, 52, 54, and 56 receives a respective valve 60, 62, 64, and 66 such as an ultra-high leak integrity packless valve that isolates a gas circuit, and is in communication with a first respective passage 70, 72, 74, and 76 that open to the valve seats 50, 52, 54, and 56 and extend towards the lower surface 26 and a second respective passage 80, 82, 84, 86 that opens to a respective port in a side of the manifold block 14 and to the valve seats 50, 52, 54, and 56. At least one of the second passages 80, 82, 84, and 86, and in the illustrated embodiment passage 80, is closed by a plug 88. In the illustrated embodiment, the first passages 70 and 72 open to the lower surface 26 and the first passages 74 and 76 combine into passage 90 that opens to the lower surface 26. The valves are movable between closed positions blocking flow between the first passages to the respective second passages, and to open positions allowing flow between the first passages and the respective second passages.

The manifold block 14 also includes a plurality of third passages 100 and 102 that open to the lower surface 26 and the side of the manifold block 14, and a plurality of fourth passages 104 and 106 that extend through the manifold block 14 from the upper surface 24 to the lower surface 26 for receiving optional components by end users, such as a liquid level low phase indicator and/or a SF regulator.

Referring now to the valves 60, 62, 64, and 66 in detail, each valve includes a seat 110 pressed into a groove 112 in the manifold block 14 surrounding the respective first passage 70, 72, 74, and 76. Surrounding each seat 110 are a plurality of diaphragms 114 and 116. In the illustrated embodiment, five diaphragms are provided, where the bottom diaphragm 114 is stainless steel, the diaphragm 116 above it is copper, and the diaphragms alternate therebetween. It will be appreciated that a suitable number of diaphragms may be provided of suitable materials, and a lubricant may be placed between them. The valves 60, 62, 64, and 66 also include a valve stem 118 secured to a valve body 120, such as by threading, and the valve body 120 may be secured to the respective valve seat 50, 52, 54, and 56, such as by threading. An identification ring 122, such as a colored O-ring, such as a green O-ring, is disposed in a seal groove on a top of each valve body 120, and then a knob 124 is pressed on to a top of each valve stem 118, such as a knurled extruded aluminum knob.

The identification ring 122 is provided to indicate to a user whether the respective valve 60, 62, 64, and 66 is open or closed. In the illustrated embodiment, the identification ring 122 is visible to provide a visual indication that the valve 60, 62, 64, or 66 is open, and hidden when the valve is closed. After the valve 60, 62, 64, and 66 is installed and in the closed position, an indicator decal 126 may be attached to a top of each knob 124, such as a decal with an arrow pointing to a closed position. In the illustrated embodiment, the knob 124 of valve 66 is a different color, such as red, than the knobs 124 of valves 60, 62, and 64, to indicate a specific passage, such as the gas supply. The provided decal 126 for the knob 124 of valve 66 may also be a different color than the decals 126 of the other valves 60, 62, and 64. It will be appreciated that the valves 60, 62, 64, and 66 may be assembled and attached to the manifold block in any suitable order.

The manifold block 14 may also be provided with indicators on its upper surface 24, for example indicia 130 etched into the surface 24 to indicate to a user what each valve 60, 62, 64, and 66, each third passage 100, 102, and each fourth passage 104, 106 connects to/controls. For example, The valve 60 can be for a high phase, the valve 66 for the gas supply/outlet, the valve 62 for PB reg., the valve 64 for tank pressure, the third passage 102 for DIP, and the third passage 100 for liquid fill, the fourth passage 104 for liquid level low phase, and the fourth passage 106 for SF regulator. The manifold block 14 may also be provided with indicators on its upper surface 24, for example indicia 132 etched in the surface 24, to indicate the position of the valves 60, 62, 64, and 66, for example open/close. The arrows on the decals 126 point to the indicia 132 to indicate the position of the valve 60, 62, 64, and 66.

Referring now to FIGS. 13-16 and the knuckle 12 in detail, the knuckle 12 includes a plurality of seal grooves 150, 152, 154, 156, 158, 160, and 162 in the upper surface 20 for receiving respective seals 164 (FIG. 8), such as a suitable O-ring, such as a low temperature nitrile or silicone O-ring, to provide a radial groove face seal. Each seal 164 surrounds a respective knuckle passage 170, 172, 174, 176, 178, 180, and 182 that extends through the knuckle 12 from the upper surface 20 to the bottom surface 22 and aligns with and is in fluid communication with one of the passages 70, 72, 90, 100, 102, 104, and 106 in the manifold block 14. The seals 164 provide a fluid tight seal between the passages of the manifold 14 and the knuckle 12. The knuckle 14 also includes a passage 184 that open to the lower surface 22 and the side of the knuckle 12. In the illustrated embodiment, the passage 170 aligns with the passage 72, the passage 172 aligns with the passage 102, the passage 174 aligns with the passage 100, the passage 176 aligns with the passage 90, the passage 178 aligns with the passage 70, the passage 180 aligns with the passage 106, and the passage 182 aligns with the passage 104.

To attach the attachment assembly 10 to the cylinder, the knuckle 12 is attached to the cylinder, such as by welding. The manifold block 14 with the valves 60, 62, 64, and 66 already installed is then attached to the knuckle using the fasteners 34, and then various components, such as regulators, valves, tubing, fittings and the like are attached to the various passages in the manifold block 14 and easily removable therefrom. The assembly 10 will deliver gas to a process requiring mass volumes, and the gas pressure and flow are controlled by a combination of the valves 60, 62, 64, and 66 and regulators assembled as accessories to the manifold block 14. The attachment assembly 10 provides modular assembly is provided that reduces refurbishment and requalification time, reduces assembly labor and costs, and simplifies servicing by providing a modular design with the downstream components plumbed to the removable manifold 14. For example, each circuit can be isolated for replacement of downstream components. The attachment assembly 10 also reduces the number of leak paths between the cylinder and the assembly 10.

Turning now to FIGS. 17-28, an exemplary embodiment of the attachment assembly is shown at 220. The attachment assembly 220 is substantially the same as the above-referenced attachment assembly 10, and consequently the same reference numerals but indexed by 200 are used to denote structures corresponding to similar structures in the attachment assemblies. In addition, the foregoing description of the attachment assembly 10 is equally applicable to the attachment assembly 220 except as noted below.

An attachment assembly 210 includes a knuckle 212 configured to be attached to a dewar and a manifold block 214 configured to be removably attached to the knuckle 212. The knuckle 212 includes an upper surface 220 and a lower surface 222 configured to be attached to the cylinder, and the manifold block 214 includes an upper surface 224 and a lower surface 226 that abuts the upper surface 220 of the knuckle 212. The manifold block 214 includes a plurality of through holes 230 that align with a respective one of a plurality of blind holes 232 extending from the upper surface 220 of the knuckle 212 toward the lower surface 222. Each through hole 230 and blind hole 232 receives a fastener 234 surrounded by a respective washer. The knuckle 12 includes one or more blind holes 240 extending from the upper surface 220 toward the lower surface 222 that receive a respective pin 242 pressed to a bottom of each blind hole 240, and the manifold block 214 includes a corresponding number of blind holes 244 extending from the lower surface 226 toward the upper surface 224 to receive the respective pins 242.

Referring to the manifold block 214 in detail, the manifold block includes a plurality of valve seats 250, 252, and 254 in the upper surface 224. Each valve seat 250, 252, and 254 receives a respective valve 260, 262, and 264 and is in communication with a first respective passage 270, 272, and 274 that open to the valve seats 250, 252, and 254 and the lower surface 226, and a second respective passage 280, 282, and 284 that opens to a side of the manifold block 214 and the valve seats 250, 252, and 254. At least one of the second passages 280, 282, and 284 and in the illustrated embodiment passage 280, is closed by a plug 288. The valves are movable between closed positions blocking flow between the first passages to the respective second passages, and to open positions allowing flow between the first passages and the respective second passages.

The manifold block 214 also includes at least one third passage 300 that opens to the lower surface 226 and the side of the manifold block 214, and a plurality of fourth passages 304 and 306 that extend through the manifold block from the upper surface 224 to the lower surface 226 for receiving optional components by end users.

Referring now to the valves 260, 262, and 264 in detail, each valve includes a seat 310 pressed into a groove in the manifold block 214 surrounding the respective first passage 270, 272, and 274. Surrounding each seat 310 are a plurality of diaphragms 314 and 316. The valves 260, 262, and 264 also include a valve stem 318 secured to a valve body 320, such as by threading, and the valve body 320 may be secured to the respective valve seat 250, 252, and 254, such as by threading. An identification ring 322, such as a colored O-ring, such as a green O-ring, is placed on a top of each valve body 320, and then a knob 324 is pressed on to a top of each valve stem 318.

The identification ring 322 is visible to provide a visual indication that the valve 260, 262, 264 is open, and hidden when the valve is closed. An indicator decal 326 may be attached to a top of each knob 324, such as a decal with an arrow pointing to a closed position. In the illustrated embodiment, the knob 324 of valve 264 is a different color, such as red, than the knobs 324 of valves 260 and 262, to indicate a specific passage. The provided decal 326 for the knob 324 of valve 264 may also be a different color than the decals 326 of the other valves 260 and 262.

The manifold block 214 may also be provided with indicators on its upper surface 224, for example indicia 330 etched into the surface 224 to indicate to a user what each valve 260, 262, 264, each third passage 300, and each fourth passage 304, 306 connects to/controls. For example, The valve 260 can be for a high phase, the valve 264 for the gas supply, the valve 262 for economizer, the third passage 400 for liquid fill, the fourth passage 404 for liquid level low phase, and the fourth passage 406 for SF regulator. The manifold block 214 may also be provided with indicators on its upper surface 224, for example indicia 332 etched in the surface 224, to indicate the position of the valves 260, 262, and 264, for example open/close. The arrows on the decals 326 point to the indicia 332 to indicate the position of the valve 260, 262, and 264.

Referring to the knuckle 212 in detail, the knuckle 212 includes a plurality of seal grooves 352, 354, 356, 358, 360, and 362 in the upper surface 220 for receiving respective seals 364, such as a suitable O-ring, to provide a radial groove face seal. Each seal 364 surrounds a respective knuckle passage 372, 374, 376, 378, 380, 382 that extends through the knuckle 212 from the upper surface 220 to the bottom surface 222 and aligns with and is in fluid communication with one of the passages 270, 272, 274, 300, 304, and 306 in the manifold block 214. The seals 364 provide a fluid tight seal between the passages of the manifold 214 and the knuckle 212. The knuckle 214 also includes passages 384 and 386 that open to the lower surface 222 and the side of the knuckle 212, and the passage 386 also is in communication with passage 388 that opens to the lower surface 222. In the illustrated embodiment, the passage 372 aligns with the passage 272, the passage 374 aligns with the passage 300, the passage 376 aligns with the passage 274, the passage 378 aligns with the passage 270, the passage 380 aligns with the passage 306, and the passage 382 aligns with the passage 304.

While the embodiments discussed herein have been related to the systems discussed above, these embodiments are intended to be exemplary and are not intended to limit the applicability of these embodiments to only those discussions set forth herein. With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

The aforementioned components, (e.g., knuckle 12, manifold block 14, valves 60, 62, 64, 66, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first,"

"second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A manifold attachment assembly for a cylinder including:
    a knuckle having an upper surface of the knuckle, a lower surface of the knuckle configured to be attached to the cylinder, a plurality of first gas passages of the knuckle extending through the knuckle from the upper surface of the knuckle to the lower surface of the knuckle, and at least one second gas passage of the knuckle extending through the knuckle from a side of the knuckle to the lower surface of the knuckle;
    a manifold block configured to be attached to the knuckle, the manifold block having an upper surface of the manifold block, a lower surface of the manifold block configured to abut the upper surface of the knuckle, a plurality of valve seats in the upper surface of the manifold block, a plurality of first gas passages of the manifold block each in communication with one of the plurality of valve seats and opening to the lower surface of the manifold block to be in fluid communication with one of the plurality of first gas passages of the knuckle, and a plurality of second gas passages of the manifold block each in communication with one of the plurality of valve seats and opening to a side of the manifold block; and
    a plurality of valves each secured to the manifold block in a respective one of the plurality of valve seats, each of the plurality of valves being movable between an open position allowing flow between a respective one of the plurality of first gas passages of the manifold block and a respective one of the plurality of second gas passages of the manifold block, and a closed position blocking flow between the respective one of the plurality of first gas passages of the manifold block and the respective one of the plurality of second gas passages of the manifold block.

2. The manifold attachment assembly according to claim 1, wherein the manifold block further includes at least one third passage of the manifold block extending through the manifold block from the upper surface of the manifold block to the lower surface of the manifold block, and the knuckle further includes at least one third gas passage of the knuckle extending through the knuckle from the upper surface of the knuckle to the lower surface of the knuckle and configured to be in fluid communication with the at least one third passage of the manifold block.

3. The manifold attachment assembly according to claim 2, wherein the manifold block further includes at least one fourth passage of the manifold block that opens to the side of the manifold block and to the lower surface of the manifold block, and the knuckle further includes at least one fourth gas passage of the knuckle extending through the knuckle from the upper surface of the knuckle to the lower surface of the knuckle and configured to be in fluid communication with the at least one fourth passage of the manifold block.

4. The manifold attachment assembly according to claim 1, wherein two of the plurality of first gas passages of the manifold block combine with one another within the manifold block and open to the lower surface of the manifold block as a combined passage.

5. The manifold attachment assembly according to claim 1, wherein the plurality of valves are ultra-high leak integrity packless valves.

6. The manifold attachment assembly according to claim 1, wherein each respective valve of the plurality of valves includes a seat pressed into a groove in a respective valve seat of the plurality of valve seats surrounding a respective first gas passage of the manifold block of the plurality of first gas passages of the manifold block, a plurality of diaphragms surrounding the seat and disposed in the respective valve seat, a valve body secured to the respective valve seat, a valve stem secured to the valve body, an identification ring disposed in a seal groove in the valve body, and a knob secured to the valve stem.

7. The manifold attachment assembly according to claim 6, wherein the identification ring is hidden when the respective valve is in the closed position and visible when the respective valve is in the open position to provide a visual indication that the respective valve is in the closed position or in the open position.

8. The manifold attachment assembly according to claim 6, wherein the knob of one of the plurality of valves is a different color from knobs of others of the plurality of valves to indicate a predetermined port.

9. The manifold attachment assembly according to claim 1, wherein each of the plurality of valves includes a colored O-ring that is a different color than other components of the plurality of valves, and wherein the colored O-ring is hidden when a respective valve of the plurality of valves is in the closed position and visible when the respective valve is in the open position to provide a visual indication that the respective valve is in the closed position or in the open position.

10. The manifold attachment assembly according to claim 1, wherein the manifold block additionally includes a plurality of through holes of the manifold block, and the knuckle additionally includes a plurality of blind holes of the knuckle extending from the upper surface of the knuckle toward the lower surface of the manifold block that align with respective ones of the plurality of through holes of the manifold block, and wherein the manifold attachment assembly further includes a plurality of fasteners received in the plurality of through holes of the manifold block and the plurality of blind holes of the knuckle to secure the manifold block to the knuckle.

11. The manifold attachment assembly according to claim 1, wherein the manifold block additionally includes a plurality of blind holes of the manifold block extending from the lower surface of the manifold block toward the upper surface of the knuckle, and the knuckle additionally includes a plurality of blind holes of the knuckle extending from the upper surface of the knuckle toward the lower surface of the manifold block that align with respective ones of the plurality of blind holes of the manifold block, and wherein a pin is received in each of a respective aligned pair of the plurality of blind holds of the manifold block and the plurality of blind holes of the knuckle to align the manifold block and the knuckle.

12. The manifold attachment assembly according to claim 1, wherein the knuckle includes a plurality of seal grooves in the upper surface of the knuckle, wherein each respective seal groove of the plurality of seal grooves surrounds a respective first gas passage of the plurality of first gas passages of the knuckle, and wherein a seal is received in each respective seal groove of the plurality of seal grooves to seal the plurality of first gas passages of the knuckle to the respective plurality of third gas passages of the manifold block.

13. The manifold attachment assembly according to claim 1, wherein the manifold block includes indicia on the upper surface of the manifold block indicating the open position and the closed position of each of the plurality of valves.

14. A manifold attachment assembly for a cylinder including:
a knuckle having an upper surface of the knuckle, a lower surface of the knuckle configured to be attached to the cylinder, a plurality of first gas passages of the knuckle extending through the knuckle from the upper surface of the knuckle to the lower surface of the knuckle, at least one second gas passage of the knuckle extending through the knuckle from a side of the knuckle to the lower surface of the knuckle, at least one third gas passage of the knuckle extending through the knuckle from the upper surface of the knuckle to the lower surface of the knuckle, at least one fourth gas passage of the knuckle extending through the knuckle from the upper surface of the knuckle to the lower surface of the knuckle, and a plurality of blind holes of the knuckle extending from the upper surface of the knuckle toward the lower surface of the knuckle;
a manifold block removably attached to the knuckle, the manifold block having an upper surface of the manifold block, a lower surface of the manifold block abutting the upper surface of the knuckle, a plurality of through holes of the manifold block each aligned with a respective one of the plurality of blind holes of the knuckle, a plurality of valve seats in the upper surface of the manifold block, a plurality of first gas passages of the manifold block each in communication with one of the plurality of valve seats and opening to the lower surface of the manifold block for fluid communication with one of the plurality of first gas passages of the knuckle, a plurality of second gas passages of the manifold block each in communication with one of the plurality of valve seats and opening to a side of the manifold block, at least one third gas passage of the manifold block extending through the manifold block from the upper surface of the manifold block to the lower surface of the manifold block for fluid communication with the at least one third gas passage of the knuckle, and at least one fourth gas passage of the manifold block that opens to the side of the manifold block and to the lower surface of the manifold block for fluid communication with the at least one fourth gas passage of the knuckle;
a fastener extending through each through hole of the plurality of through holes of the manifold block and corresponding blind hole of the plurality of blind holes of the knuckle and secured to the knuckle to removably attach the manifold block to the knuckle; and
a plurality of valves each secured to the manifold block in one of the plurality of valve seats, each valve of the plurality of valves being movable between an open position allowing flow between a respective one of the plurality of first gas passages of the manifold block and a respective one of the plurality of second gas passages of the manifold block, and a closed position blocking flow between the respective one of the plurality of first gas passages of the manifold block and the respective one of the plurality of second gas passages of the manifold block.

15. The manifold attachment assembly according to claim 14, wherein each respective valve of the plurality of valves includes a seat pressed into a groove in a respective valve seat of the plurality of valve seats, a plurality of diaphragms surrounding the seat and disposed in the respective valve seat, a valve body secured to the respective valve seat, a valve stem secured to the valve body, an identification ring disposed in a seal groove in the valve body, and a knob secured to the valve stem, and wherein the identification ring is hidden when the respective valve is in the closed position and visible when the respective valve is in the open position to provide a visual indication that the respective valve is in the closed position or in the open position.

* * * * *

UNITED STATES PATENT AND TRADEMARK OFFICE
CERTIFICATE OF CORRECTION

PATENT NO.         : 10,690,289 B2
APPLICATION NO.    : 15/802098
DATED              : June 23, 2020
INVENTOR(S)        : Adam Palac et al.

It is certified that error appears in the above-identified patent and that said Letters Patent is hereby corrected as shown below:

In the Specification

Column 5, Line 52 should be: manifold block 14
Column 5, Line 52 should be: The knuckle 12
Column 6, Line 6 should be: provides a modular assembly that
Column 6, Line 10 should be: manifold block 14
Column 7, Line 23 should be: For example, the valve
Column 7, Line 45 should be: The knuckle 212 also includes passages Signed and Sealed this
Twenty-fifth Day of August, 2020

Andrei Iancu
*Director of the United States Patent and Trademark Office*